United States Patent
Himmelmann

(10) Patent No.: US 10,331,147 B2
(45) Date of Patent: Jun. 25, 2019

(54) TEMPERATURE ADJUSTING VALVE, A TURBINE PUMP ASSEMBLY AND METHOD OF ADJUSTING FLOW THROUGH A VALVE

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 239 days.

(21) Appl. No.: 14/879,202

(22) Filed: Oct. 9, 2015

(65) Prior Publication Data
US 2017/0102722 A1    Apr. 13, 2017

(51) Int. Cl.
*F02K 9/46*    (2006.01)
*F04D 27/00*    (2006.01)
(Continued)

(52) U.S. Cl.
CPC ............. *G05D 23/02* (2013.01); *F02K 9/46* (2013.01); *F04D 27/004* (2013.01); *F16K 31/002* (2013.01); *F05D 2300/5021* (2013.01)

(58) Field of Classification Search
CPC .. F02K 9/46; F02K 9/58; G05D 23/02; F05D 2300/5021; F04D 27/004; F16K 31/002;
(Continued)

(56) References Cited

U.S. PATENT DOCUMENTS

| 4,391,093 A |   | 7/1983 | Gulick |   |
|---|---|---|---|---|
| 5,754,090 A | * | 5/1998 | Arensmeier | ........... H01H 37/48 337/123 |

(Continued)

FOREIGN PATENT DOCUMENTS

| EP | 2682590 |   | 1/2014 |   |
|---|---|---|---|---|
| EP | 2682590 A2 | * | 1/2014 | .............. F02K 1/76 |

(Continued)

OTHER PUBLICATIONS

Physical and Thermal Properties of ZirconiumTungstate Nanoparticles with Different Morphologies from Hydrothermal Synthesis, Wu, Hongchao, Iowa State University, Graduate Thesis and Dissertations.*

(Continued)

*Primary Examiner* — Christopher R Zerphey
*Assistant Examiner* — Schyler S Sanks
(74) *Attorney, Agent, or Firm* — Cantor Colburn

(57) ABSTRACT

A temperature adjusting valve includes, a first member made of a first material having a first coefficient of thermal expansion, a second member made of a second material having a second coefficient of thermal expansion that is in operable communication with the first member, and a flow passageway at least partially defined by a distance between a first surface of the first member and a second surface of the second member, the first coefficient of thermal expansion and the second coefficient of thermal expansion are selected such that a flow area of the flow passageway changes in response to changes in temperature of at least one of the first member and the second member the distance also is adjustable independently of temperature changes of the first member and the second member.

5 Claims, 3 Drawing Sheets

(51) Int. Cl.
*F16K 31/00* (2006.01)
*G05D 23/02* (2006.01)

(58) Field of Classification Search
CPC ...... F01D 17/085; F01D 17/205; F01D 17/00; F01D 17/06
USPC .......................................... 236/101 B, 99 H
See application file for complete search history.

(56) References Cited

U.S. PATENT DOCUMENTS

| | | |
|---|---|---|
| 6,035,644 A | 3/2000 | Lahaye et al. |
| 2010/0050520 A1* | 3/2010 | Arnold .................... B01J 8/009 48/190 |
| 2011/0278483 A1* | 11/2011 | Sheridan ................ F16K 1/123 251/129.01 |
| 2014/0007555 A1* | 1/2014 | Delong .................... F02K 1/76 60/204 |

FOREIGN PATENT DOCUMENTS

| | | | | |
|---|---|---|---|---|
| GB | 2302915 A | * | 2/1997 | ............. F01L 13/08 |
| WO | 9930007 | | 6/1999 | |

OTHER PUBLICATIONS

Chest of Books, Iron Alloys, Feb. 10, 2010.*
European Search Report, European Application No. 16192860.1, dated Mar. 1, 2017, European Patent Office; European Search Report 7 pages.

* cited by examiner

US 10,331,147 B2

TEMPERATURE ADJUSTING VALVE, A TURBINE PUMP ASSEMBLY AND METHOD OF ADJUSTING FLOW THROUGH A VALVE

BACKGROUND

Some turbine pump assemblies employ speed control valves to adjust mass flow of gases that determine the rotational speed of the turbine pump assembly. While such speed control valves work well for the purpose for which they were designed, industry is always receptive to systems and methods that provide additional features and controls.

BRIEF DESCRIPTION

Disclosed herein is a temperature adjusting valve. The valve includes, a first member made of a first material having a first coefficient of thermal expansion, a second member made of a second material having a second coefficient of thermal expansion that is in operable communication with the first member, and a flow passageway at least partially defined by a distance between a first surface of the first member and a second surface of the second member, the first coefficient of thermal expansion and the second coefficient of thermal expansion are selected such that a flow area of the flow passageway changes in response to changes in temperature of at least one of the first member and the second member the distance also is adjustable independently of temperature changes of the first member and the second member.

In addition to one or more of the features described above, or as an alternative, in further embodiments the distance between a first surface of the first member and a second surface of the second member increases in response to decreases in temperature of at least one of the first member and the second member.

In addition to one or more of the features described above, or as an alternative, in further embodiments the increases in the distance is in response to decreases in temperature of both the first member and the second member.

In addition to one or more of the features described above, or as an alternative, in further embodiments the distance is an axial distance.

In addition to one or more of the features described above, or as an alternative, in further embodiments increases in the distance cause a flow area of the flow passageway to increase.

In addition to one or more of the features described above, or as an alternative, in further embodiments a radial distance between a third surface of the first member and a fourth surface of the second member is altered by radial movement of the third surface relative to the fourth surface in response to changes in temperature of at least one of the first member and the second member.

In addition to one or more of the features described above, or as an alternative, in further embodiments the radial distance increases in response to decreases in temperature of at least one of the first member and the second member.

In addition to one or more of the features described above, or as an alternative, in further embodiments at least one of the third surface and the fourth surface has at least one radial recess formed therein.

In addition to one or more of the features described above, or as an alternative, in further embodiments the first member is biased relative to the second member to increase the distance.

In addition to one or more of the features described above, or as an alternative, in further embodiments at least one of the first coefficient of thermal expansion and the second coefficient of thermal expansion is negative.

In addition to one or more of the features described above, or as an alternative, in further embodiments the first member is a sleeve and the second member is a stem of a gas flow valve.

Further disclosed herein is a method of adjusting flow through a valve. The method includes, altering temperature of at least one of a first member, made of a first material with a first coefficient of thermal expansion, and a second member, made of a second material having a second coefficient of thermal expansion, the first member and the second member defining at least a portion of a flow passageway therebetween, altering at least one dimension of at least one of the first member and the second member with the altering of temperature thereof, changing a flow area of the flow passageway with the altering of the at least one dimension, and changing the flow area of the flow passageway by moving the first member relative to the second member independent of the changes in temperature.

In addition to one or more of the features described above, or as an alternative, further embodiments include increasing the flow area with a decrease in temperature of at least one of the first member and the second member.

In addition to one or more of the features described above, or as an alternative, further embodiments include changing an axial dimension of the flow area with the altering of the temperature.

In addition to one or more of the features described above, or as an alternative, further embodiments include changing a radial dimension of the flow area with the altering of the temperature.

Further disclosed herein is a turbine pump assembly. The turbine pump assembly includes, a turbine speed control valve comprising: a first member made of a first material having a first coefficient of thermal expansion, a second member made of a second material having a second coefficient of thermal expansion that is in operable communication with the first member, and a flow passageway at least partially defined between the first member and the second member, the first coefficient of thermal expansion and the second coefficient of thermal expansion are selected such that a flow area of the flow passageway changes in response to changes in temperature of at least one of the first member and the second member.

In addition to one or more of the features described above, or as an alternative, further embodiments include a fly weight governor assembly configured to move the second member relative to the first member proportional to rotational speed of the fly weight governor assembly.

In addition to one or more of the features described above, or as an alternative, in further embodiments the fly weight governor assembly moves the second member in a direction toward closure of the turbine speed control valve in response to increases in rotational speed of the fly weight governor assembly.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
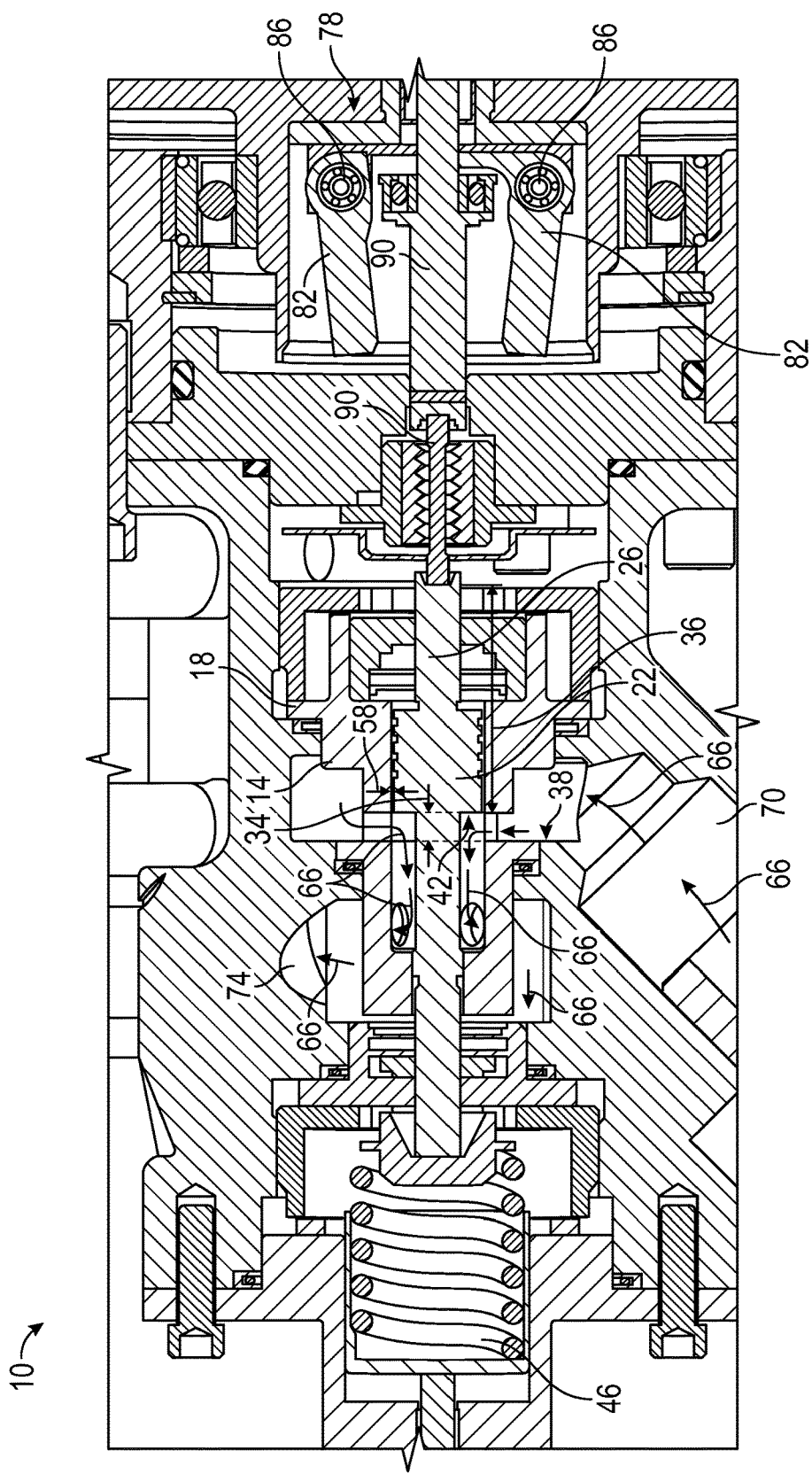
FIG. 1 depicts a cross sectional view of a temperature adjusting valve disclosed herein.
Figure 2:
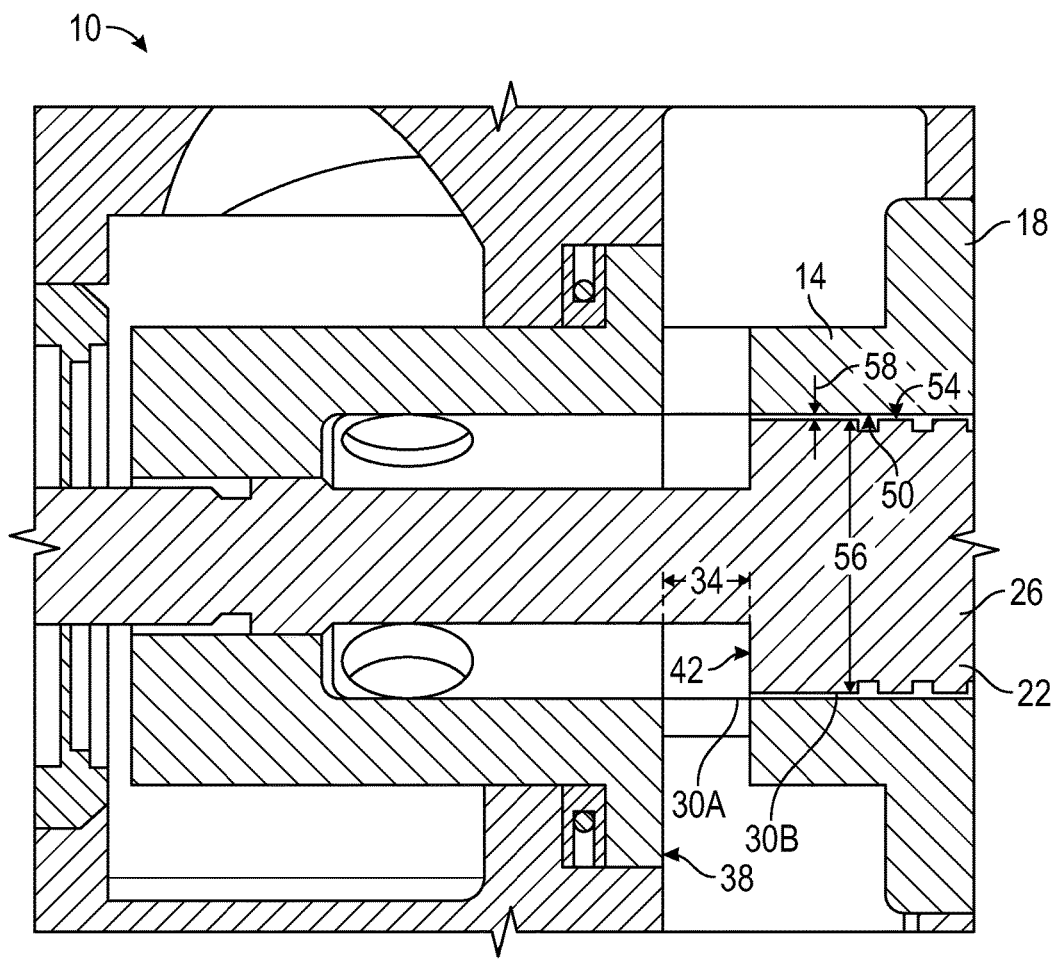
FIG. 2 depicts a magnified view of a portion of the temperature adjusting valve of FIG. 1.

Referring to FIGS. 1 and 2, cross sectional views of a temperature adjusting valve disclosed herein is illustrated at 10. The temperature adjusting valve 10 includes a first member 14, made of a first material 18 that has a first coefficient of thermal expansion, and a second member 22, made of a second material 26 that has a second coefficient of thermal expansion. The second member 22 is axially movable relative to the first member 14. At least one flow passageway 30A, 30B (with two being illustrated in this embodiment) is defined at least in part between the first member 14 and the second member 22. The first coefficient of thermal expansion and the second coefficient of thermal expansion are selected such that a flow area of the flow passageway(s) 30A, 30B changes in response to changes in temperature of one or both of the first member 14 and the second member 22. In one embodiment of the temperature adjusting valve 10, as illustrated, the first member 14 is a sleeve and the second member 22 is a stem of a turbine pump assembly (TPA) 32 (shown better in FIG. 3).

In one embodiment the flow passageways 30A is formed axially and the flow passageway 30B is formed radially. The flow passageway 30A is formed in part by an axial distance 34 between a first surface 38 of the first member 14 relative to a second surface 42 of the second member 22. The axial distance 34 changes in response to changes in temperature of one or both of the first member 14 and the second member 22. In so doing flow area of the flow passageway 30A is changed. The axial distance 34 is configured to increase as the temperature of at least one of the members 14, 22 decreases in one embodiment. It should be noted that while the illustrated embodiment shows the first surface 38 being offset radially inwardly of the second surface 42, other embodiments can have the surfaces 38, 42 radially aligned such that they can butt against one another to close the flow passageway 30A during certain conditions.

A biasing member 46, shown in one embodiment as a compression spring, biases the second member 22 relative to the first member 14 in a direction that causes an increase in the axial distance 34 upon shrinkage of an axial dimension 36 (FIG. 1 only) of the second member 22. It should also be noted that the temperature adjusting valve 10 can be configured to allow adjustment of the distance 34 even during times when the temperatures of the members 14, 22 do not change. In such an embodiment the distance 34 is adjustable independently of temperature changes in the members 14, 22.

The radial flow passageway 30B is defined between a third surface 50 of the first member 14 and a fourth surface 54 of the second member 22 in one embodiment. The third surface 50 is an inner radial surface of the first member 14 and the fourth surface 54 is an outer radial surface of the second member 22. A flow area of the flow passageway 30B is defined by a radial distance 58 between the third surface 50 and the fourth surface 54. In one embodiment the flow area of the flow passageway 30B is increased as the radial distance 58 is increased in response to a decrease in temperature of the second member 22 that causes a reduction in a radial dimension 56 (FIG. 2 only) of the second member 22. The increase in the radial distance 58 between the third surface 50 and the fourth surface 54 may be in response to decreases in temperature of both the first member 14 and the second member 22. Additionally, one or both of the third surface 50 and the fourth surface 58 may have one or more radial recesses 62 therein in one embodiment.

The foregoing structure depends upon the coefficients of thermal expansion between the first member 14 and the second member 22 to operate. The amount that the distances 34, 58 vary can be controlled, at least in part, by choosing the materials 18, 26 based in part on their relative values of coefficients of thermal expansion. These coefficients allow for differences in axial and/or radial expansion and contraction of the members 14, 22, which will result in greater or lesser changes in flow area of the flow passageway 30A, 30B for a given change in temperature. Selecting at least one of the first coefficient of thermal expansion and the second coefficient of thermal expansion to be negative while the other is positive can provide even greater control over temperature caused changes in flow area of the flow passageways 30A, 30B.

Figure 3:
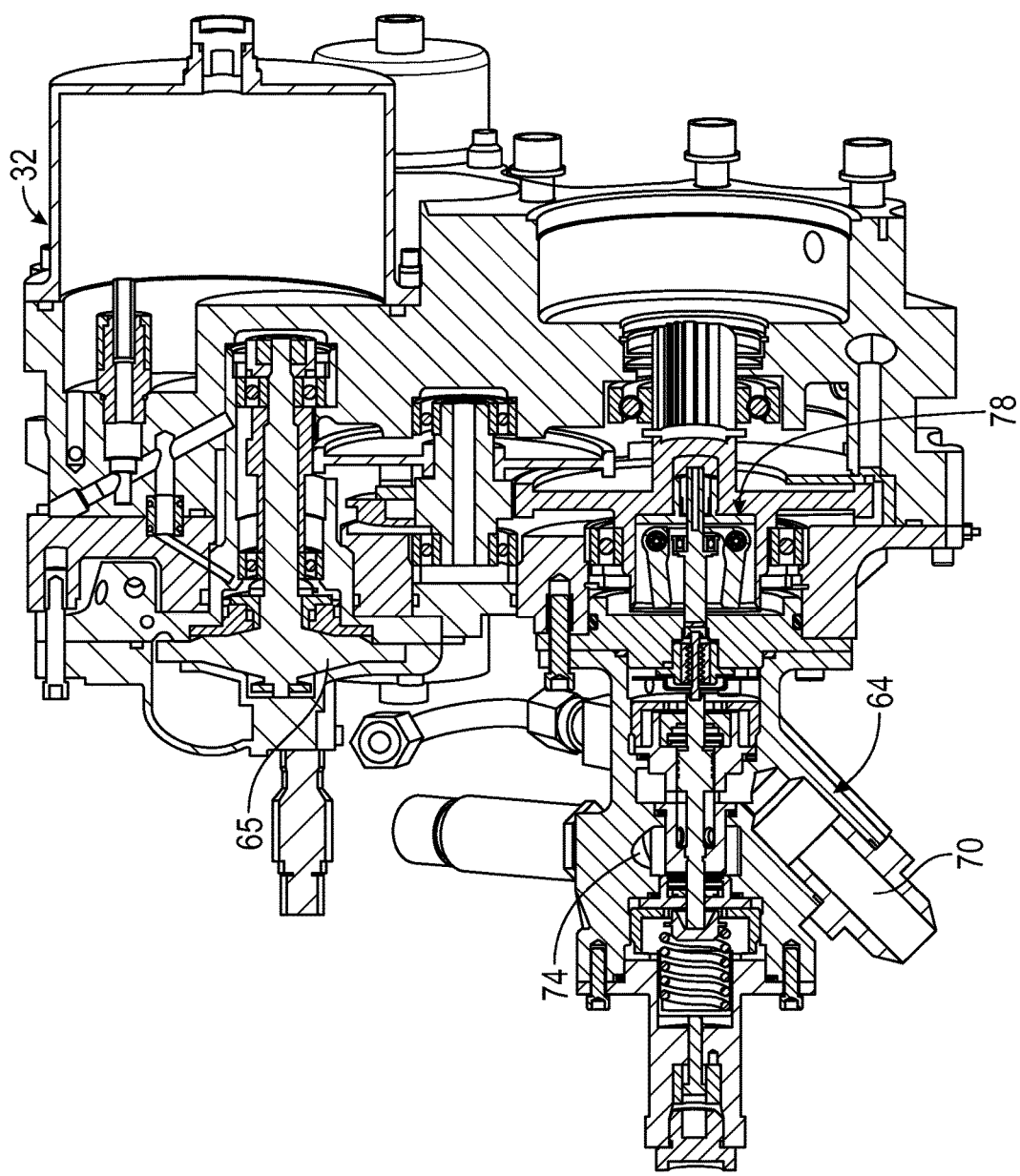
FIG. 3 depicts a perspective sectioned view of a turbine pump assembly employing disclosed herein.

Referring to FIGS. 2 and 3, a cross sectional perspective view of the turbine pump assembly 32 is illustrated with a turbine speed control valve 64 disclosed herein. The turbine speed control valve 64 includes the functions of the temperature adjusting valve 10 as well as other functions as described hereunder. Rotational speed of a turbine shaft 65 is controlled by the turbine speed control valve 64. The valve 64 is held open (the position of the valve as shown in the FIGs) by the biasing member 46 when the turbine shaft 65 is rotating. Gas flows in the direction of arrows 66 (shown in FIG. 2 only) through an inlet 70, into the valve 64, through the flow passageway(s) 30A, 30B, and out through an outlet 74 and causes the turbine shaft 65 to rotate. As the gas pressure rises, the turbine shaft 65 accelerates. As the shaft 65 spins a fly weight governor assembly 78 also rotates. The rotation of the fly weight governor assembly 78 causes centripetal forces to urge arms 82 of the assembly 78 radially outward about pivot points 86. The rotation of the arms 82 turns radial movement into axial movement of the second member 22 via connecting members 90. This axial movement urges the second member 22 toward the biasing member 46 compressing it in the process. The axial movement causes a decrease in the flow area of the flow passageway 30A, as elaborated on above. As the turbine shaft 65 rotates faster the valve 64 is pushed further closed. When the shaft 65 reaches full speed the centripetal forces on the arms 82 are balanced against the axial forces in the biasing member 46 with the flow area of the flow passageway 30A opened just far enough to maintain the turbine shaft 65 speed. If additional load is applied to the TPA 32 the shaft 65 will begin to decelerate as its output power is proportional to the mass flow rate of the gas passing through the valve 64. As the shaft 65 slows down centripetal force acting on the arms 82 is reduced allowing the valve 64 to open by moving the second member 22 in a direction of bias of the biasing member 46. In this way the opening and closing of the valve 64 continues and maintains the speed of the shaft 65.

Inlet gas temperatures can vary from −250 degrees F. to +100 degrees F. The temperature compensating aspect of the valve 64 disclosed herein allows for more mass flow to flow through the valve 64 when the valve is subjected to extreme cold temperatures thereby helping to boost performance of the turbine pump assembly 32. For example, one embodiment of the valve 64 includes the first material 18 for the first member 14 having a relatively low (negative in this case) coefficient of thermal expansion, Invar (a registered trademark of Imphy Alloys) (−30−6/degree K), and the second material 26 for the second member 22 having a relatively high coefficient of thermal expansion, magnesium (26−6/degree K). Use of these materials can provide an automatic increase in axial opening of the flow passageway 30A in one embodiment of 25% as the gas temperature is decreased from 72 to −250 degrees F. Similarly, the these materials can provide an automatic increase in radial opening of the flow passageway 30B in one embodiment of 200% as the gas temperature is decreased from the same 72 to −250 degrees F.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of controlling a rotation speed of a turbine shaft in a turbine pump assembly, the method comprising:
    adjusting flow through a valve by altering temperature of at least one of a first member, made of a first material with a first coefficient of thermal expansion, and a second member, made of a second material having a second coefficient of thermal expansion, the first member and the second member defining at least a portion of a flow passageway therebetween, wherein the first member is a sleeve and the second member is disposed within the sleeve, the second member being axially movable relative to the first member, the second member being operably connected to a biasing member such that the biasing member biases the second member relative to the first member, wherein at least one connecting member is operably connected to the second member to convert a radial motion into an axial motion of the second member toward the biasing member;
    altering at least one dimension of at least one of the first member and the second member with the altering of temperature thereof;
    changing a flow area of the flow passageway with the altering of the at least one dimension;
    changing the flow area of the flow passageway by moving the first member relative to the second member independent of the changes in temperature; and
    moving the second member relative to the first member proportional to a rotational speed of a fly weight governor assembly.

2. The method of claim 1, further comprising increasing the flow area with a decrease in temperature of at least one of the first member and the second member.

3. The method of claim 1, further comprising changing an axial dimension of the flow area with the altering of the temperature.

4. The method of claim 1, further comprising changing a radial dimension of the flow area with the altering of the temperature.

5. The method of claim 1, wherein the first member comprises a nickel-iron alloy and the second member comprises magnesium.

* * * * *